May 7, 1929.　　　E. T. STRANDLUND　　　1,712,408

WASHER

Filed June 11, 1928

E. T. Strandlund,
INVENTOR

BY Victor J. Evans
ATTORNEY

Patented May 7, 1929.

1,712,408

UNITED STATES PATENT OFFICE.

ELMER T. STRANDLUND, OF HOMESTEAD, MONTANA.

WASHER.

Application filed June 11, 1928. Serial No. 284,554.

This invention relates to a split washer, the general object of the invention being to provide a wing on the washer which, when in a position forming an extension of the washer, will prevent the washer from being opened, and when bent to a position at right angles to the washer, will act as a hinge for permitting the two parts of the washer to be moved to open position, whereby the washer can be easily placed on a shaft and the like by opening the washer and slipping it on the shaft and then closing the washer and bending the wing to straight position to hold the washer in locked position on the shaft.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1:
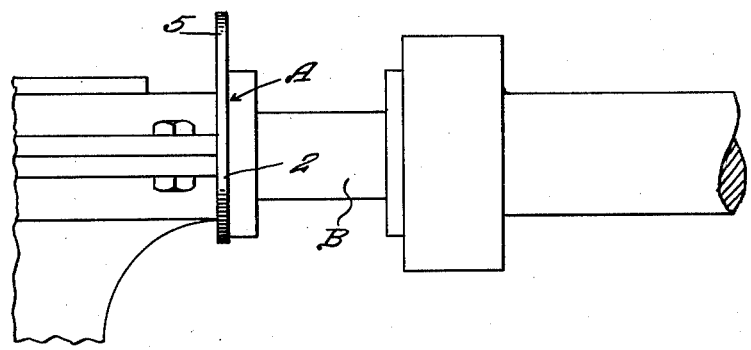
Figure 1 is a view showing the improved washer in use as taking up end play in a shaft.
Figure 2:
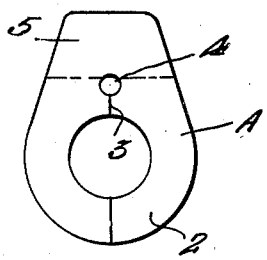
Figure 2 is a face view of the washer.
Figure 3:
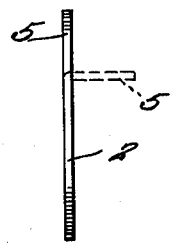
Figure 3 is an edge view thereof.
Figure 4:
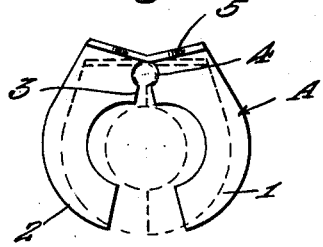
Figure 4 is a view showing the washer in open position.

As shown in these views, the washer A is formed in two parts 1 and 2 by the slits 3, the slits being diametrically arranged, with the inner slit connecting the large hole in the washer with a small hole 4 formed therein. A wing 5 is formed on the washer by providing an extension on that side of the washer which contains the small hole 4. By bending the wing at right angles to the washer, the bending point passing through the hole 4, the wing will act as a hinge for connecting the two parts of the washer together so that the two parts can be moved away from each other, as shown in Figure 4, the wing bending in the middle during this action. This will permit the washer to be placed on a shaft, such as shown at B in Figure 1, to take up end play of the shaft and then the two parts of the washer are moved together to close the washer on the shaft and then the wing is bent into straight position and in this position, the wing acts to lock the two parts of the washer in closed position as it cannot bend in this straight position. The small hole 4 acts to prevent cracking of the parts.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:

1. A centrally apertured washer, a bendable, integral tongue at one side thereof, the washer being bifurcated radially from the medial point of the line of bending of the wing to the central aperture and being split on a prolongation of the same radial line at the opposite side of said aperture, whereby said wing, when bent at right angles to the plane of the washer, will flex along its medial line to permit opening and closing of the washer, and when lying in the plane of the washer, will act to hold it in closed position.

2. The washer as in claim 1 in which an eccentrically positioned aperture forms part of said radial bifurcation between the line of bending of the wing and the central aperture of the washer.

In testimony whereof I affix my signature.

ELMER T. STRANDLUND.